United States Patent [19]

Fujioka

[11] Patent Number: 5,063,465
[45] Date of Patent: Nov. 5, 1991

[54] HEAD SUPPORTING MECHANISM OF A RECORDING/REPRODUCING APPARATUS

[75] Inventor: Masahiko Fujioka, Fuji, Japan

[73] Assignee: Kabushiki Kaisha Toshiba, Kawasaki, Japan

[21] Appl. No.: 442,397

[22] Filed: Nov. 27, 1989

Related U.S. Application Data

[63] Continuation of Ser. No. 24,555, Mar. 11, 1987, abandoned.

[30] Foreign Application Priority Data

Mar. 25, 1986 [JP] Japan .................. 61-66281

[51] Int. Cl.$^5$ ............... G11B 5/48; G11B 21/16
[52] U.S. Cl. ............................................. 360/104
[58] Field of Search .................. 360/104–106, 360/97–99

[56] References Cited

U.S. PATENT DOCUMENTS

| 3,931,641 | 1/1976 | Watrous | 360/104 |
| 4,167,765 | 9/1979 | Watrous | 360/104 |
| 4,327,388 | 4/1982 | Wanek | 360/104 |
| 4,343,025 | 8/1982 | Kronfeld et al. | 360/105 |
| 4,535,374 | 8/1985 | Anderson et al. | 360/104 |

FOREIGN PATENT DOCUMENTS 59-116955  7/1984  Japan .................. 360/104

OTHER PUBLICATIONS

Nikkei Mechanical, pp. 103–104 (May 5, 1986).

Primary Examiner—John H. Wolff
Attorney, Agent, or Firm—Finnegan, Henderson, Farabow, Garrett and Dunner

[57] ABSTRACT

Heads of a recording/reproducing apparatus are arranged so as to face two opposite recording surfaces of a disk recording medium, individually. One of the heads is fixed to a carriage, while the other is fixed to a head arm. A leaf spring is fixed to the terminal end portion of the head arm. A metal member, weldable to the leaf spring, is embedded in a fixing portion of the carriage, which is formed of synthetic resin. The leaf spring and the metal member are fixed by welding, so that two head supporting members are fixed to each other. The heads are moved on the surfaces of the disk by a head supporting mechanism, which is a combination of the two supporting members.

5 Claims, 3 Drawing Sheets

HEAD SUPPORTING MECHANISM OF A RECORDING/REPRODUCING APPARATUS

This application is a continuation of application Ser. No. 07/024,555, filed Mar. 11, 1987 now abandoned.

BACKGROUND OF THE INVENTION

This invention relates to a head supporting mechanism (carriage assembly) of a recording/reproducing apparatus (for example, floppy disk drive, hereinafter referred to as FDD), which has read and write heads facing their corresponding recording surfaces of a disk, on two opposite sides thereof.

Conventionally known are FDDs which have recording and reproducing heads opposed individually to two opposite recording surfaces of a disk-shaped recording medium. In the FDDs of this type, each head is mounted on a supporting member. Two corresponding supporting members are combined into a head supporting mechanism for one recording medium. Referring now to FIG. 1, a specific arrangement of the head supporting mechanism will be described. In FIG. 1, head 2 is attached to supporting member (carriage) 4 so as to face one side of the disk, while head 3 is attached to supporting member (head arm) 5 so as to face the other side of the disk. Member 5 is fixed to member 4 by tightening screws 7, with the aid of pad 6.

Magnetic heads 2 and 3 must be adjusted to predetermined positions relative to the supporting members. Also, the supporting members must be adjusted to specified positions relative to a guide portion (not shown). These adjustments are essential to the compatibility of the FDD for recording media or data information. In the case of the head supporting mechanism shown in FIG. 1, however, even though heads 2 and 3 are once adjusted to suitable positions, they may possibly be dislocated while screws 7 are being tightened. This is because supporting members 4 and 5 are dislocated by load and torque, which are produced when screws 7 are tightened. Thus, in the conventional head supporting mechanism, it is difficult to adjust heads 2 and 3 to positions within a range of dislocation of several microns from their respective reference positions. If the dislocation of heads 2 and 3 is substantial, the FDD cannot enjoy high track density, and access errors may be caused.

SUMMARY OF THE INVENTION

The object of this invention is to provide a head supporting mechanism in which each head can be prevented from being dislocated from its reference position.

In order to achieve the above object, a head supporting mechanism of this invention, whereby heads are retained and moved on surfaces of a recording medium, comprises a first head (12) opposed to one surface of the recording medium (11); first head supporting means (14) fixedly fitted with the first head; a second head (13) opposed to the other surface of the recording medium; and second head supporting means (15, 16) fixedly fitted with the second head, the first and second supporting means being connected integrally to each other by welding or adhesive.

In the arrangement described above, the two head supporting members are coupled or fixed to each other by welding or deposition. While they are being fixed, therefore, the supporting members cannot be subjected to any torque or load. Thus, both heads can be adjusted accurately to their respective reference positions, and hence located on a desired data track with high accuracy. In consequence, the data recording density and track density can be improved. Also, a disk memory device, using the head supporting mechanism of this invention, can enjoy a large memory capacity, and data access errors can be reduced.

DETAILED DESCRIPTION OF THE PREFERRED EMBODIMENTS

Referring now to FIGS. 2 to 6, an FDD according to a first embodiment of this invention will be described. The FDD of this embodiment is characterized by the arrangement of its head supporting mechanism (carriage assembly). More specifically, it is characterized in that two corresponding head supporting members are connected or fixed integrally to each other by spot welding. This feature or advantage will be stressed in the description to follow.

Figure 1:
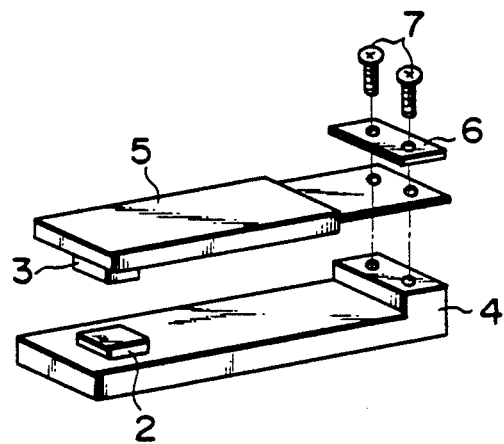
FIG. 1 is an exploded perspective view of a prior art head supporting mechanism.
Figure 2:
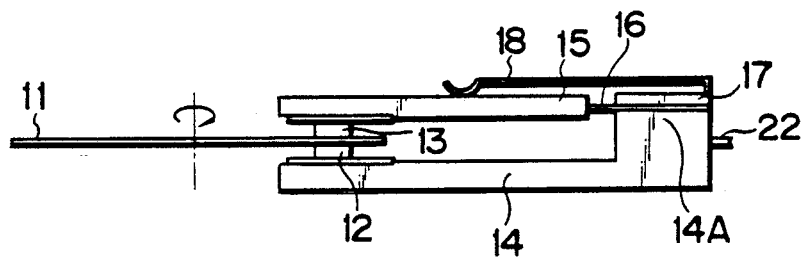
FIG. 2 is a side view of a head supporting mechanism according to a first embodiment of this invention.
Figure 3:
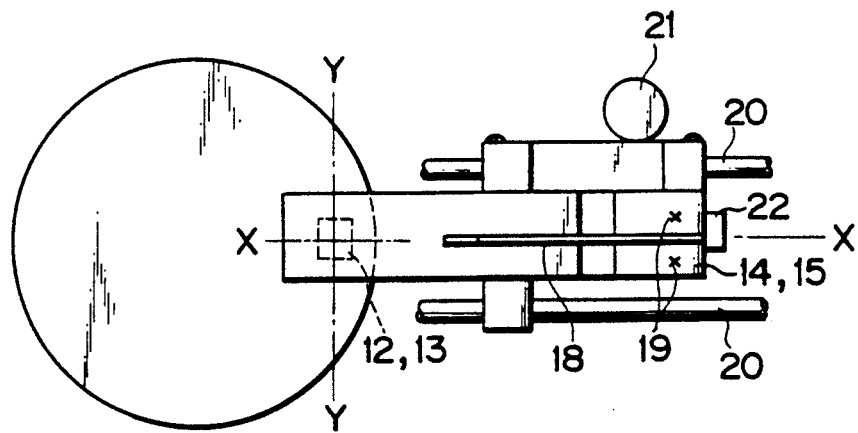
FIG. 3 is a plan view of the head supporting mechanism shown in FIG. 2.
Figure 4:
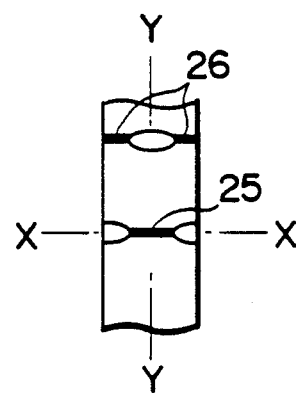
FIG. 4 is a plan view of a head.
Figure 5:
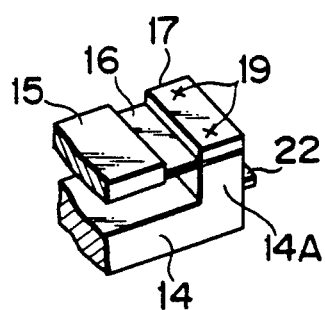
FIG. 5 is a perspective view of the principal part of the head supporting mechanism shown in FIGS. 2 and 3.

As shown in FIGS. 2 and 3, heads 12 and 13 are arranged so as to face two opposite recording surfaces of a disk or recording medium 11, individually. If these heads are tunnel-erase heads, they each have read/write gap 25 and erase gaps 26, as shown in FIG. 4. Heads 12 and 13 are attached to side-0 supporting member (carriage) 14 and side-1 supporting member (head arm) 15, respectively, by adhesive bonding, for example. Leaf spring 16 is fixed to one end of head arm 15. Spring 16 and arm 15 may be molded integrally. As shown in FIG. 5, fixing portion 14A of carriage 14, spring 16, and pad 17 are fixed to one another by means of spot welds 19. Spring 18 pushes head arm 15 toward recording medium 11, thereby bringing head 13 into contact with medium 11. Carriage 14 is slidably mounted on guides 20. Driven by stepping motor 21, the carriage moves on guides 20, in the radial direction of disk 11, thus locating heads 12 and 13 on a desired track of disk 11.

Figure 6:
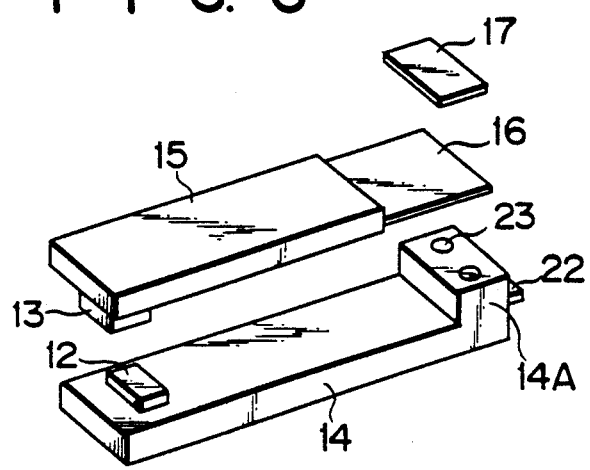
FIG. 6 is an exploded perspective view of the head supporting mechanism shown in FIGS. 2 and 3.

Referring now to FIG. 6, there will be described a method of fixing carriage 14 and head arm 15 by means of spot welds 19. First, carriage 14 and head arm 15, as shown in FIG. 6, are prepared. The principal part of carriage 14 is formed of synthetic resin. Metal members 23, which can be welded to leaf spring 16, are embedded in fixing portion 14A of carriage 14. Portion 14A is provided with projection (terminal) 22, which is connected electrically to members 23. Spring 16 is fixed to head arm 15. Heads 12 and 13 are fixed to carriage 14 and arm 15, respectively. Heads 12 and 13 may not be directly fixed to carriage 14 and 15; heads 12 and 13 may be mounted to carriage 14 and 15 with gimbal spring, for example. Then, carriage 14 and arm 15 are adjusted so that heads 12 and 13 are located in their respective predetermined reference positions. This adjustment is performed as follows. Carriage 14 and head arm 15 are held in position by means of a suitable jig mechanism. Then, they are adjusted with the aid of a floppy disk for adjustment, and temporarily held so that the X- and Y-axes of the head shown in FIG. 5 are aligned as shown in FIG. 3, and so that the parallelism or levelness of the heads is within a predetermined error range. Thereafter, one electrode of an electric welder is connected to members 23 by means of projection 22, while the other electrode is brought into contact with pad 17. Then, a current of a predetermined level is applied across the electrodes. By these processes, members 23 embedded in carriage 14, leaf spring 16, and pad 17 are spot-welded, as shown in FIG. 5.

In this embodiment, carriage 14 and head arm 15 are fixed to each other by spot welding. During the welding work, they are not subjected to any torque or heavy load. While fixing carriage 14 and arm 15, therefore, heads 12 and 13 cannot be dislocated. In other words, both heads can be adjusted accurately to their respective reference positions. Thus, the heads can be located on the data track with high accuracy, so that the data recording density can be improved. Also, a disk memory device, using the head supporting mechanism of this embodiment, can enjoy a large memory capacity, and data access errors can be reduced.

Referring now to FIGS. 7 to 12, alternative embodiments of this invention will be described. In these drawings, like reference numerals are used to designate like portions as shown in FIGS. 2 to 6, for simplicity of illustration.

Figure 7:
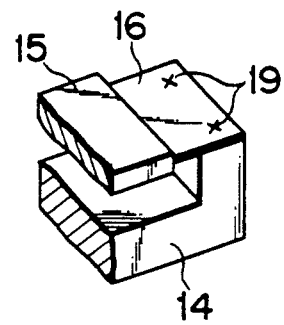
FIG. 7 is a perspective view of the principal part of a head supporting mechanism according to a second embodiment of the invention.

Pad 17 is used in the arrangement shown in FIGS. 2 to 6. As shown in FIG. 7, however, carriage 14 and arm 15 may be fixed by spot-welding the carriage to leaf spring 16, without using pad 17.

Figure 8:
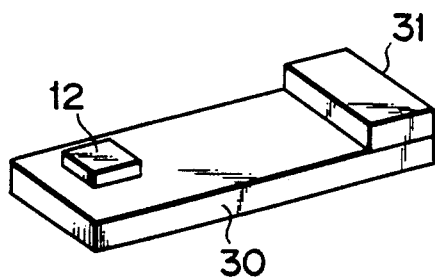
FIGS. 8 and 9 are perspective views for illustrating modifications of head supporting members (carriages) according to the first and second embodiments.
Figure 9:
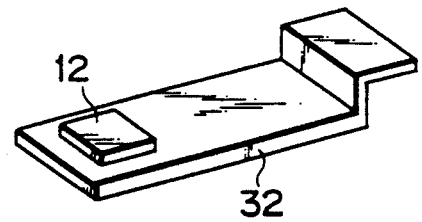

In the first embodiment described above, metal members 23, which are embedded in plastic carriage 14, are welded to leaf spring 16. However, the present invention is not limited to this arrangement, and metal piece 31, which is fixed to plastic supporting member 30, as shown in FIG. 8, may be welded to leaf spring 16. As shown in FIG. 9, moreover, the whole body of carriage 32 may be formed of metal so that part of carriage 32 is welded to leaf spring 16.

Figure 10:
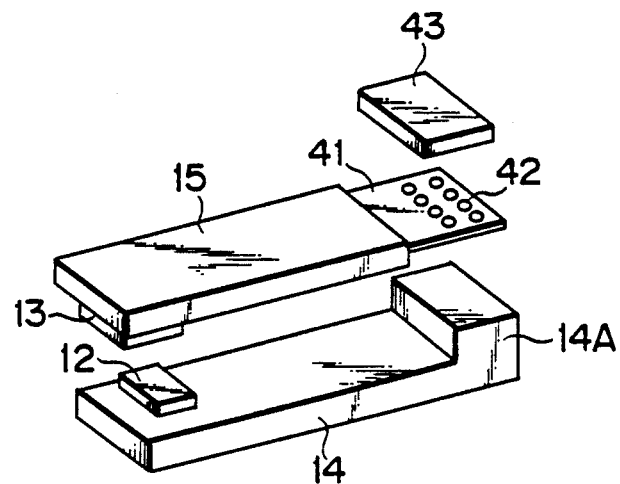
FIG. 10 is an exploded perspective view of a head supporting mechanism according to a third embodiment of the invention.
Figure 11:
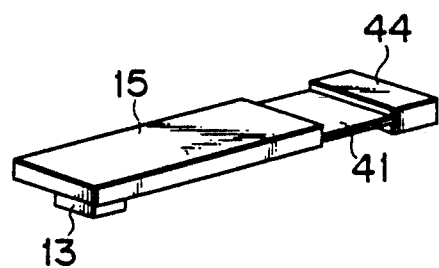
FIG. 11 is a perspective view for illustrating an example of the construction of a head supporting member (head arm) according to the third embodiment of the invention; and, FIG. 12 is a perspective view of a head supporting mechanism according to a fourth embodiment of the invention.

FIG. 10 shows another embodiment of this invention. In FIG. 10, perforations 42 are bored through the terminal end portion of leaf spring 41, which is fixed to head arm 15. Member 43 is made of a material (e.g., synthetic resin, for use with plastic carriage 14) fusible with carriage 14. Carriage 14 and arm 15 are aligned with each other. Then, member 43, leaf spring 41, and carriage 14 are heated by ultrasonic waves, for example, and member 43 and fixing portion 14A of carriage 14 are coupled together with weld (fusion weld). During this process, the plastic material fills perforations 42 of leaf spring 41, so that spring 41 is fixed to carriage 14. Plastic member 44 for welding and spring 41 may be preformed by integral molding, as shown in FIG. 11. In this case, member 44 and fixing portion 14A of carriage 14, shown in FIG. 10, are coupled with welding. The welding work can be facilitated by previously molding spring 41 and member 44. Carriage 14 need not be formed wholly of synthetic resin, and at least portion of fixing portion 14A may be formed of a weldable material.

Figure 12:
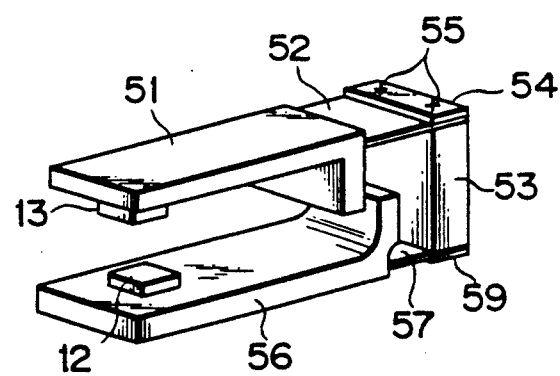

In connection with the above embodiments, the head supporting mechanism of this invention has been described as being of the "one-side-open" type. This invention is not limited to such an arrangement, and may be applied also to a head supporting mechanism of the "both-sides-open" type (described in, for example, FIG. 7 of U.S. Pat. No. 4,089,029). Referring now to FIG. 12, an embodiment will be described in which this invention is applied to a head supporting mechanism of the "both-sides-open" type. In FIG. 12, leaf spring 52, fixed to first swing arm 51, spacer 53 (actually, part of the carriage), and pad 54 are fixed to one another by means of spot welds 55. Leaf spring 57, fixed to second swing arm 56, spacer 53, and pad 59 are also fixed by spot welding. Thus, the swing arms of the head supporting mechanism of the "both-sides-open" type may be coupled together by means of spot welds.

Alternatively, leaf springs 52 and 57 and spacer 53 may be fixed in the manner shown in FIG. 8. In this case, leaf springs 52 and 57 are each formed with a plurality of perforations, and pad 54 is formed of a material weldable (fusible) with spacer 53, for example plastic. As spacer 53 and pad 59, as well as spacer 53 and pad 54, are coupled with welding, plastic material fills the perforations of springs 52 and 57, so that two supporting members 51 and 56 are coupled integrally to each other.

In the above embodiments, the arm and the carriage, or the arms are connected by welding. This invention is not limited to this. The arm and the carriage, or the arms can be connected by means of an adhesive. For example, in FIG. 6, leaf spring 16 and portion 14A may be connected by an adhesive. In this case, there is no need to provide members 22, 23. And also in FIG. 10, portion 14A, leaf spring 41 and member 43 may be connected by adhesive. Since the adhesive fills perforations 42, good connection is obtained. A conventional adhesive, for example, epoxy resin may be used for adhesive.

The above embodiments relate to an FDD. This invention is not restricted to this. It can apply to a magnetic head apparatus (hard disk drive) and an optical disk drive.

According to this invention, relative dislocation of the heads can be minimized during the process of fixing, after the alignment of the supporting members. Conventional supporting mechanisms are subject to a dislocation of several microns, for example. In the mechanism of the invention, however, the dislocation can be restricted to one micron or less. Moreover, the process of fixing the supporting members is easy, requiring only a relatively short time. Furthermore, the minimized dislocation does not require readjustment.

A circuit for processing signals read by heads 12 and 13, as well as a circuit for producing signals to be supplied to the heads, may be arranged and operated in the same manner as a signal processing circuit of conventional FDDs.

What is claimed is:

1. A head supporting mechanism of an apparatus for recording and reproducing data from a disk recording medium comprising:
   a first head means for recording data on and reproducing data from one surface of the disk recording medium;
   first supporting means for supporting the first head means at one end thereof;
   a second head means for recording data on and reproducing data from the other surface of the disk recording medium;
   second supporting means for supporting the second head means at one end thereof, said second supporting means including a head supporting portion for supporting said second head means and a leaf spring means for flexibly supporting said head supporting portion; and
   at least one member formed of a weldable material and embedded in said first supporting means at the other end thereof, said embedded member being partly exposed for fixedly receiving said leaf spring means, said leaf spring means being welded to the embedded member for connecting said first and second supporting members.

2. A head supporting mechanism of an apparatus for recording and reproducing data from a floppy disk recording medium, said supporting mechanism comprising:
   a first head means for recording data on and reproducing data from one surface of the floppy disk recording medium;
   first supporting means for supporting the first head means at one end thereof;
   a second head means for recording data on and reproducing data from the other surface of the floppy disk recording medium; and
   second supporting means for supporting the second head means at one end thereof, said fist and second supporting means each having weldable material at the other ends thereof and being integrally connected to each other by welding the weldable material at said other ends, for accurately adjusting said first and second supporting means to their respective reference positions.

3. The supporting mechanism according to claim 2, further comprising a supporting member, wherein said first supporting means includes a first supporting portion fitted with the first head means, and a first leaf spring fixed to the first supporting portion and welded to the supporting member, and wherein said second supporting means includes a second supporting portion fitted with the second head, and a second leaf spring fixed to the second supporting portion and welded to the supporting member.

4. The supporting mechanism according to claim 2, wherein said first supporting means includes a supporting portion fitted with the first head means, a leaf spring fixed to the supporting portion and having at least one perforation, and a retaining member facing the second supporting means across the leaf spring and coupled to the second supporting means by welding so as to fill the perforation of the leaf spring thereby fixing the spring to the second supporting means.

5. The supporting mechanism according to claim 2, further comprising a supporting member, wherein said first supporting means includes a first supporting portion fitted with the first head means, and a first leaf spring fixed tote first supporting portion and coupled to the supporting member by welding, and wherein said second supporting means includes a second supporting portion fitted with the second head means and a second leaf spring fixed to the second supporting portion and coupled to the supporting member by welding.

* * * * *